April 11, 1933.   A. W. MEADER   1,903,469

UPHOLSTERY ATTACHING DEVICE

Filed May 31, 1930

INVENTOR
Albert W. Meader

BY

ATTORNEYS

Patented Apr. 11, 1933

1,903,469

UNITED STATES PATENT OFFICE

ALBERT W. MEADER, OF DETROIT, MICHIGAN, ASSIGNOR OF ONE-HALF TO ROBERT MITCHELL, OF DETROIT, MICHIGAN

UPHOLSTERY ATTACHING DEVICE

Application filed May 31, 1930. Serial No. 458,861.

The present invention pertains to a novel fastener designed particularly for attaching upholstery pads to automobile bodies, although useful in similar or related operations.

The object of the present invention is to simplify and reduce the expense of the present method of attaching upholstery pads by means of snap fasteners. The specific manner in which this object is accomplished is described in detail in the subsequent parts of this specification.

The device of the present invention consists essentially of a binding strip of L or channel shape applied to the edges of the pad which are to be fastened to the automobile body. The strip is formed with hooks which are slipped into corresponding slots in the automobile body and incidentally serve also to retain the upholstery fabric on the cardboard or other body of the pad.

The invention is fully disclosed by way of example in the following description and in the accompanying drawing, in which—

Reference to these views will now be made by use of like characters which are employed to designate corresponding parts throughout.

Figure 1:
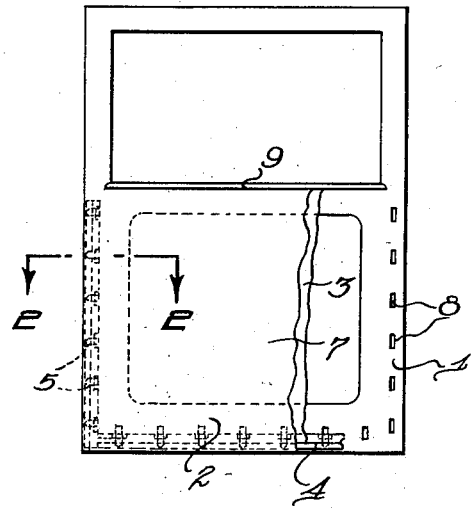
Figure 1 is a side elevation of a part of an automobile with the upholstering pad mounted thereon in accordance with the present invention.
Figure 2:
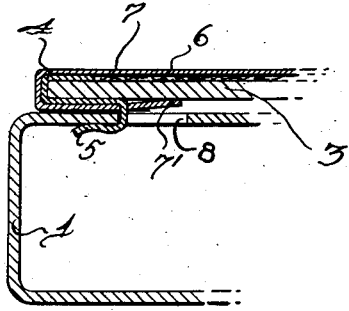
Fig. 2 is a fragmentary cross sectional view taken on the line 2—2 of Figure 1.

In Figures 1 and 2 is illustrated a part of an automobile body to be upholstered, such as a door panel 1. These body parts are covered with upholstery pads consisting of a cardboard body member covered with a suitable fabric material. At the present time, the pads are commonly attached to the automobile body by various styles of snap fasteners.

The pad is indicated in Figure 1 by the numeral 2 and comprises a cardboard body 3 as usual. The fastening means, however, is of novel construction and comprises channel members 4 fitted over the edges which are to be secured. For example, in the case of a door as in Figure 1, the vertical edges and the lower edge of the panel are thus provided with channels. At the free edge of one of the sides of the channel, preferably the longer side, are formed numerous spring clips or hooks 5 which are spaced according to a system which will presently be mentioned. Each hook has a portion lying substantially parallel to the channel side on which it is formed, and this portion is preferably bent concave towards said side as designated by the numeral 5a. The extremity of the hook is preferably pointed as at 5b for a purpose which will presently appear.

Padding material 6 is laid upon the body member 3 at the side thereof engaged by the unmodified or unhooked sides of the channels in order to provide a substantially uniform surface flush with said channel sides. Upholstery fabric 7 is now drawn tightly over this side of the board 3 and over the hooks 5. In this operation, the pointed ends 5b of the hooks facilitate penetration through the fabric 7 and avoid the necessity of previously formed slits for accommodating the hooks. Figure 2 clearly illustrates how the fabric 7 is held by the hooks 5, and the free edges 7' of the material are then glued to the side of the board 3 nearer the body member 1.

For the purpose of attaching the upholstery pad to the member 1, the latter is formed with slots 8 for receiving the hooks 5. The slots are spaced according to the spacing of the hooks 5 which in turn are provided in sufficient number to support the pad. The spacing of opposed slots across the body portion, or horizontally of the member shown in Figure 1, is less than the spacing of similarly opposed hook ends 5b. The upholstery pad must therefore be bent on a vertical line for insertion of the hooks, and after the bending pressure is relieved, the pad resumes its original position whereupon the hooks engage the body member 1 at the outer edges of the slots 8 as shown in Figure 2. Moreover, the slots are of such size to permit ample play of the hooks therein, especially in the vertical direction as may be seen in Figure 1. Thus, the pad has a floating relation to the body structure after insertion of the hooks in the slots, whereby the pad may be accurately adjusted to the proper position, regardless of irregularities in manufacture and in the formation of the hooks and slots.

Figure 3:
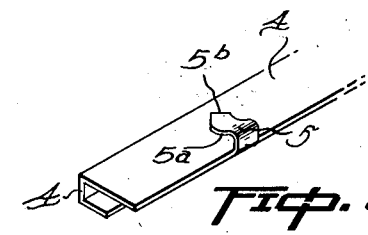
Fig. 3 is a perspective view of a portion of one of the retaining members illustrating the projecting portion struck up from the side thereof.

It will also be seen by reference to Figures 2 and 3 that the concave part 5a of each hook provides a spring structure which binds rather firmly on the body member 1 adjacent the slots 8, while the pointed end 5b is spaced somewhat farther from the adjacent channel side and provides a wider mouth for easy application of the hook to the channel side. The pad is usually moved as far as possible in a given direction, and permanently fixed in such position by means of a finishing member 9 engaging the pad and also the body member 1. In the case of a door, this finishing member may be the garnish mold designated by the numeral 9 in Figure 1. After attachment of this member, the pad cannot be shifted or removed unless the finishing member is also removed.

Figure 4:
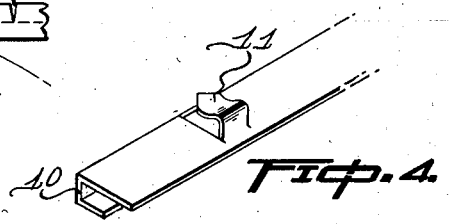
Fig. 4 is a perspective view of a slightly modified form in which the projecting members are struck up from the body portion.

In the modification shown in Figure 4, the channel 10 has its hooks struck directly out of one of the channel sides as indicated by the numeral 11. It will be evident that this method of stamping the channel structure requires a smaller width of metal than the construction shown in Figure 3.

Figure 5:
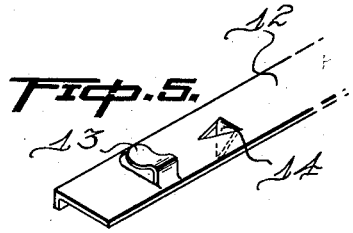
Fig. 5 illustrates a modified construction for attaching the retaining member to the upholstery pad.

In Figure 5 the binding strip is an L-shaped member 12 having hooks 13 struck out in the manner described in connection with Figure 4 and is further formed with downwardly or inwardly extending prongs 14 also struck out of the same side for penetration and anchorage in the board 3.

Figure 6:
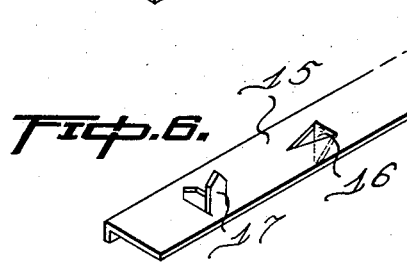
Fig. 6 illustrates another modified construction for attaching the retaining member to the upholstery pad and to the wall of the automobile.

A similar L-shaped binding strip 15 is shown in Figure 6 and has prongs 16 serving the same purpose as the members 14 in Figure 5. The fastening prongs 17, however, are straight and stand preferably at right angles to the side from which they are struck. This construction is useful where the upholstery pad is to be secured to a wooden body member, in which case the prongs 17 are driven directly into such member.

Figure 7:
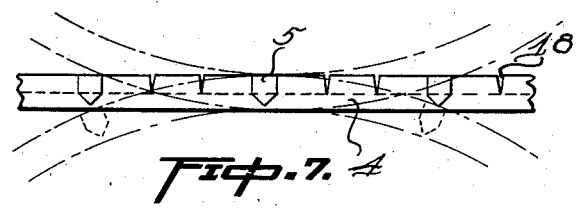
Fig. 7 illustrates the manner in which the retaining strip may be bent to fit a curved pad.

Figure 7 illustrates the provision of slits 18 in one of the edges of the binding strip, whereby the latter may be bent to either side of its longitudinal axis, as shown in dot and dash lines, for the purpose of rounding a corner at the edge of the body board to which it is applied.

Comparing the present invention with the use of separate snap fasteners now common in the art, it may be said that more fastening points or hooks may be provided according to the present invention without increased cost, while it is obvious that an increased number of the common snap fasteners involves a proportionally greater expenditure. This advantage in favor of the present invention is due to the fact that numerous fastening points are formed on a single strip of stamped metal, and the provision of more or less fastening points involves only the building of the dies accordingly, without any variation in the amount of metal required or in the time required for assembly.

In the use of snap fasteners, the edges of the upholstery material must be cut out or recessed around each fastener. Not only is this an expensive manual operation, but ample material must be provided to enable secure attachment of the fabric to the cardboard body of the pad. No such recesses are necessary in the use of the present invention, as a result of which ample anchorage area is furnished with smaller widths of fabric than required for corresponding sizes of work where snap fasteners are used. Even though the saving may be less than an inch at each edge of the fabric, it is quite important in view of the sizes of the fabric pieces and the numbers in which they are used in automobile production.

Another and obvious advantage of the present invention is that the metal binding strips prevent buckling at the edges of the upholstery pad.

Although specific embodiments of the invention have been illustrated and described, it will be understood that various alterations in the details of construction may be made without departing from the scope of the invention, as indicated by the appended claims.

What I claim is:—

1. A fastener of the character described comprising a binding strip of angular cross section and having hook members extending therefrom toward the angle thereof, in combination with a body member having slots adapted to receive said hook members.

2. A fastener of the character described comprising a binding strip of angular cross section and having hook members extending therefrom toward the angle thereof, in combination with a body member having slots adapted to receive said hook members, and a covering fabric over said body member and retained by said hook members.

3. A fastener of the character described comprising a binding strip having hook members extending therefrom, in combination with a body member having slots adapted to receive said hook members, each hook member having a portion in resilient relation to said strip, said body member being held at points between said strip and said resilient portions.

4. An upholstery pad having binding strips applied to selected edges thereof, integral members formed on said strips, and directed substantially parallel to the plane of said pad, in combination with a body member having slots for receiving said hook members.

5. An upholstery pad having binding strips applied to selected edges thereof, integral hook members formed on said strips, and directed transversely of said strips and towards said edges respectively nearer to the hooks, in combination with a body member having slots for receiving said hook members.

6. An upholstery pad having binding strips applied to opposed edges thereof, hook members formed on said strips and directed transversely of said strips and towards said edges respectively nearer to the hooks, in combination with a body member having slots for receiving said hook members, opposed slots being spaced a smaller distance apart than the extremities of opposed hooks on said opposed strips, whereby said pad must be bent between said strips to permit insertion of said hook members in said slots.

7. In a device for detachably securing upholstery to a pair of spaced door pillars and a door sill, a supporting panel having the upholstery mounted thereon, tongue and slot connections associated with the sides and bottom edges of the panel and the door pillars and door sill, respectively, the slots associated with the pillars being elongated and so spaced that the center portion of the panel must be bowed to permit the co-acting tongues to enter said elongated slots and of such length that after the tongues are engaged the panel may be pushed downwardly to engage the tongue and slot connections associated with the sill member, and means co-acting with said panel to prevent the raising of the panel.

8. In a device for detachably securing upholstery to a pair of spaced door pillars and a door sill, a supporting cardboard panel having the upholstery mounted thereon, tongue and slot connections associated with the sides and bottom edges of the panel and the door pillars and door sill, respectively, the slots associated with the pillars being elongated and so spaced that the center portion of the panel must be bowed to permit the co-acting tongues to enter said elongated slots and of such length that after the tongues are engaged the panel may be pushed downwardly to engage the tongue and slot connections associated with the sill member, and a garnish strip adapted to fixedly secure the upper edge of the panel.

9. In a device for detachably securing upholstery to a pair of spaced door pillars and a door sill, a supporting panel having the upholstery mounted thereon, tongue and slot connections associated with the sides and bottom edges of the panel and the door pillars and door sill, respectively, the slots associated with the side members being elongated and so spaced that the center portion of the panel must be bowed to permit the adjacent tongues to enter the elongated slots and of such length that after the tongues are engaged the panel may be pushed downwardly to engage the tongue and slot connections associated with the sill members, and a garnish strip adapted to secure the upper edge of the panel in a flat position and prevent the raising of said panel, whereby both the side and bottom connections may be effectively secured in position.

In testimony whereof I affix my signature.

ALBERT W. MEADER.